United States Patent
Cowans

(10) Patent No.: US 7,337,625 B1
(45) Date of Patent: Mar. 4, 2008

(54) THERMAL CONTROL SYSTEMS FOR PROCESS TOOLS REQUIRING OPERATION OVER WIDE TEMPERATURE RANGES

(75) Inventor: Kenneth W. Cowans, Fullerton, CA (US)

(73) Assignee: Advanced Thermal Sciences, Anaheim, CA (US)

( * ) Notice: Subject to any disclaimer, the term of this patent is extended or adjusted under 35 U.S.C. 154(b) by 0 days.

(21) Appl. No.: 11/590,855

(22) Filed: Nov. 1, 2006

(51) Int. Cl.
*F25B 41/04* (2006.01)
(52) U.S. Cl. .......................................... 62/210; 62/222
(58) Field of Classification Search .......... 62/210–211, 62/222–225
See application file for complete search history.

(56) References Cited

U.S. PATENT DOCUMENTS

| | | | |
|---|---|---|---|
| 2,797,068 A | 6/1957 | McFarlan | |
| 3,557,568 A | 1/1971 | Pecault et al. | |
| 4,729,424 A | 3/1988 | Mizuno et al. | |
| 5,335,508 A | 8/1994 | Tippmann | |
| 5,351,502 A | 10/1994 | Gilles et al. | |
| 5,588,590 A * | 12/1996 | Sakakibara et al. | 236/92 B |
| 5,826,438 A * | 10/1998 | Ohishi et al. | 62/199 |
| 6,148,634 A | 11/2000 | Sherwood | |
| 6,205,795 B1 | 3/2001 | Backman et al. | |
| 6,467,279 B1 | 10/2002 | Backman et al. | |
| 6,494,054 B1 | 12/2002 | Wong et al. | |
| 6,948,335 B2 | 9/2005 | Matsuoka | |
| 2004/0148956 A1 | 8/2004 | Arshansky et al. | |

* cited by examiner

*Primary Examiner*—William E. Tapolcai
(74) *Attorney, Agent, or Firm*—Jones, Tullar & Cooper, P.C.; Raymond A. Bogucki, Esq.

(57) ABSTRACT

A system and method for maintaining the temperature of a thermal transfer fluid at a selectable level within a wide temperature range, so as to operate a process tool in a chosen mode employing at lease two cascaded stages, each operating with a different fluid in a separate refrigeration cycle. By interrelating energy transfers between parts of upper and lower stages, thermal efficiency is maximized and a smooth continuum of temperature levels can be provided. The refrigerants advantageously have vaporization points below and above ambient, for upper and lower stages respectively, and employs the upper stage for a constant refrigeration capacity, controlling the final temperature with the lower stage. The system allows for a further extension of range because the thermal transfer fluid can be heated for some process tool modes as the refrigeration cycles are run at low loads.

3 Claims, 9 Drawing Sheets

THERMAL CONTROL SYSTEMS FOR PROCESS TOOLS REQUIRING OPERATION OVER WIDE TEMPERATURE RANGES

FIELD OF THE INVENTION

This invention relates to temperature control systems which heat and/or cool separate process equipment by circulating thermal transfer fluid at a temperature which may be selected within a wide range but precisely maintained.

BACKGROUND OF THE INVENTION

Applicant has previously developed temperature control units utilizing pressurized liquid refrigerant, expansion valve devices, and heat exchangers/evaporators to provide the thermal capacity needed for cooling or heating thermal transfer fluid that flows within a process tool, in order to maintain the tool at a selected temperature level. The units function with high thermal efficiency, provide precise control, and rneet the demanding needs of modern high-capital intensive industries, such as semiconductor industries using cluster tools. For such applications, long life and high reliability are essential, but the requirements also include compactness and small footprint because of the high costs of floor footage in such facilities.

These industries are continually evolving and developing more demanding applications which need more versatile temperature controls but at the same time at lower cost. More particularly, such installations now demand selectable refrigeration and optional heating of thermal transfer fluid in the range from about −80° C. to about +60° C., with precision and efficiency. It should be intuitively evident that such a wide temperature range cannot be met economically by conventional refrigeration systems. One approach to the problem of operating over a range of refrigeration temperatures is that proposed by Mizuno et al in U.S. Pat. No. 4,729,424 wherein a cascaded series of refrigeration units are employed. Each unit supplies its own refrigeration capacity as commanded by a central system, to provide stepwise refrigeration capability. Temperature levels between the different refrigeration increments are established by heating within the incremental range. The use of a number of refrigeration units (four in the Mizuno et al proposal) presents particular problems in terms of space requirements, efficiency and reliability. Also, refrigeration units, for long life, should not be run intermittently. Any specific refrigerant further imposes some inherent limitation, depending upon its critical temperature, on the range of operation. In addition efficiency is inherently reduced when heating must be employed to counteract over-cooling.

SUMMARY OF THE INVENTION

Systems and methods in accordance with the invention utilize an intercoupled cascaded arrangement of at least two modular refrigeration units, the first of which operates with a refrigerant having a relatively higher evaporation point to provide a refrigeration capacity predominantly for midrange operation. A second refrigeration unit, interacting in key respects with the first refrigeration unit, adds to the refrigeration capacity of the first unit while controlling the temperature of a thermal transfer fluid that circulates through the process tool. The second refrigeration unit, which uses a refrigerant having a lower evaporation point, can lower the temperature of the thermal transfer fluid to as low as −80° C. The system operates both refrigeration units efficiently in an integrated manner while providing a smooth continuum of operating temperature levels. When ambient or above ambient temperatures are needed, for transient or steady-state operation, a heater in the thermal transfer fluid loop to and from the process tool can be employed independently as the refrigeration units function at low loads.

The two refrigeration units are both designed in compact modular form, and for efficiency interchange thermal energy between the refrigeration cycles although having only limited connections between them. Different combinations of modules can be employed, for different applications, with functions being controlled by a digital control system.

The inter-relationship between the first and second refrigeration units includes one or more expansion valves in each unit, with the first unit supplying a controlled liquid/vapor mixture to an interchange heat exchanger/evaporator in the second unit which functions as a condenser in that unit. In the first unit, the gaseous pressurized output of the compressor is condensed, as by an air-cooled condenser arranged so that cooling air can also extract heat energy from compressed gaseous refrigerant in the adjacent second refrigeration unit. Chilled second refrigerant from the interchange heat exchange/evaporator is fed via a thermal expansion system that is precisely controllable and free of flood back propensity to a heat exchanger/evaporator that cools the thermal transfer fluid in the loop including the process tool.

More specifically the expansion valve system in the second refrigeration unit includes a variable duty cycle solenoid expansion valve having a relatively large orifice. Varying the duty cycle integrates the flow to establish a chosen average level, while the orifice area is capable of supplying large flows for high demand conditions. The output of the solenoid expansion valve is fed to a thermal expansion valve having a variable orifice and incorporating a feedback input reflecting the temperature at the output of the interchange heat exchange/evaporator. Both the solenoid expansion valve and the thermal expansion valve in the second refrigeration unit as well as the expansion valve in the first refrigeration unit are responsive to command inputs which control the refrigeration capacity supplied by each subsystem.

The modular construction is such that each refrigeration unit can be used independently, with minimal connections between them being easily engaged when needed. In addition the first or upper refrigeration unit can employ a water-cooled condenser, if desired—in this case the first unit will also usually have a separate fan for extracting heat energy from the compressed gas conduit in the second or lower stage refrigeration unit.

A number of features are included in these modules to improve useful life, increase reliability and provide assurances against catastrophic failures. The refrigerant unit in the second refrigeration unit presents theoretical problems because of gas pressure buildup, due to the low boiling point, but this is obviated by the use of an excess gas chamber as well as a preset pressure burst disks. The thermal transfer loop is substantially confined within the second lower stage module, but nonetheless includes a storage reservoir, a differential pressure regulation system, and a gas purge system.

BRIEF DESCRIPTION OF THE DRAWINGS

A better understanding of the invention may be had by reference to the following description taken in conjunction with the accompanying drawings, in which.

DETAILED DESCRIPTION OF THE INVENTION

Figure 1:
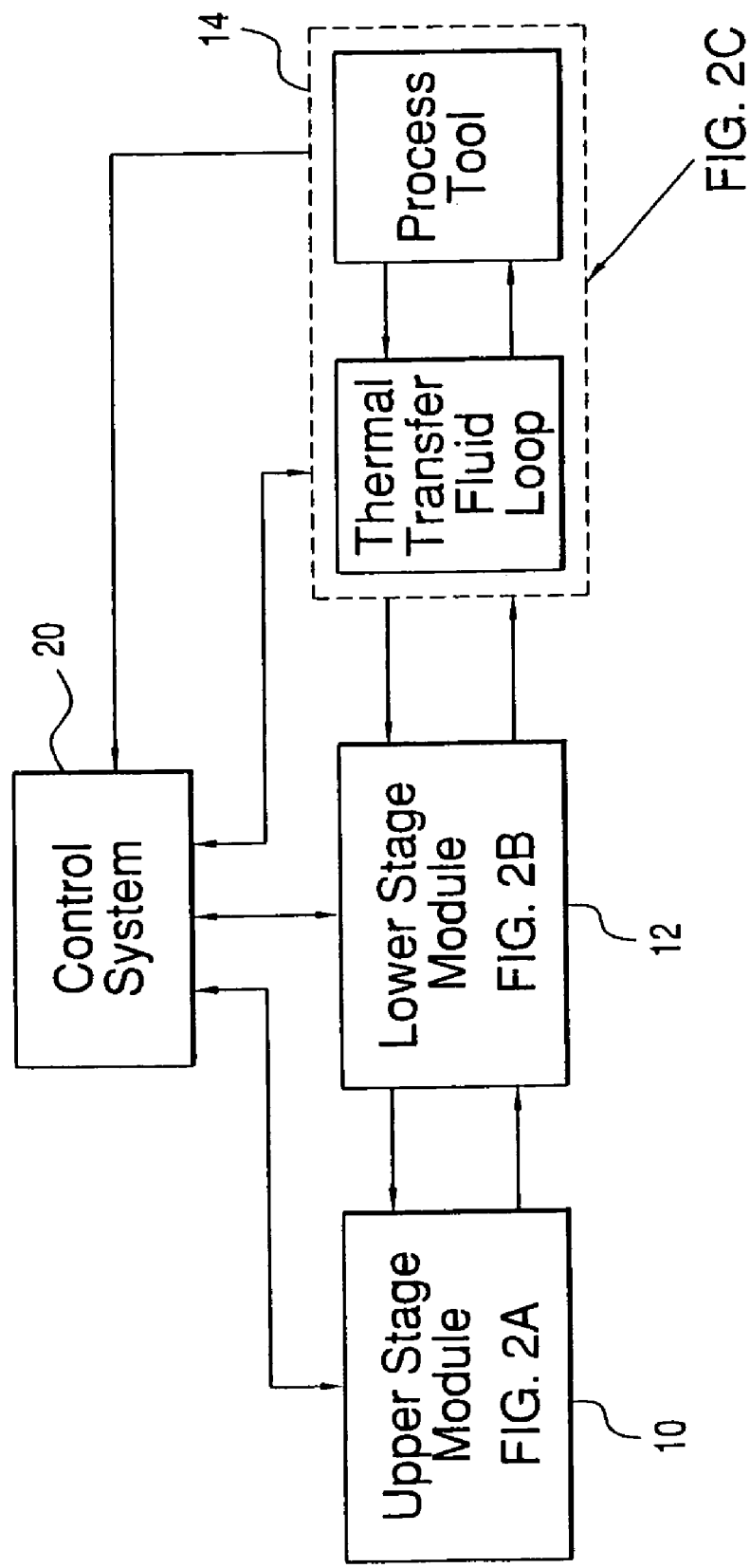
FIG. 1 is a block diagram of a system in accordance with the invention including an associated control system and a process tool, and also showing how separate modules and units depicted in FIGS. 2A, 2B and 2C are interchangeable.
Figure 2:
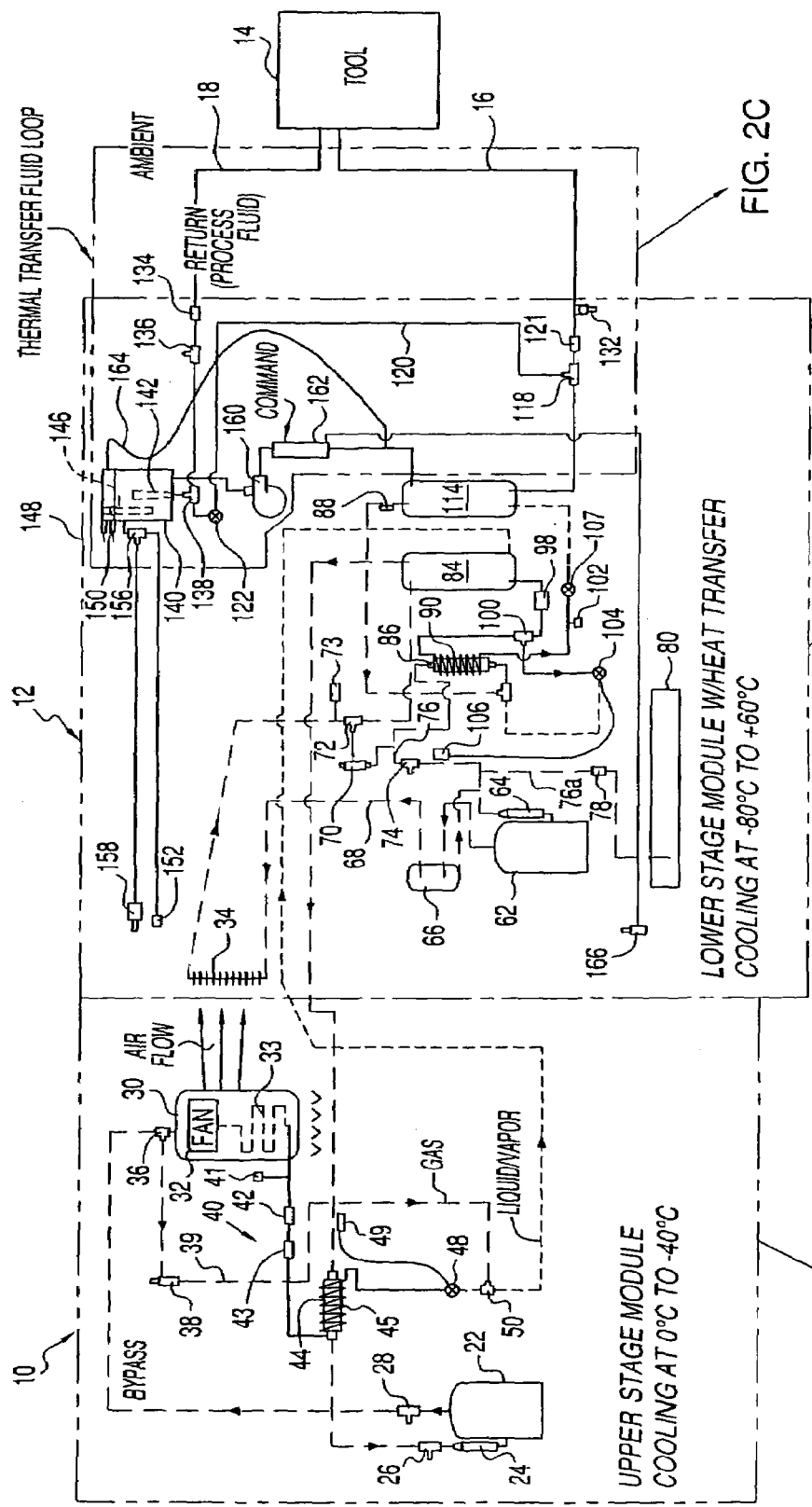
FIG. 2 is a set of four drawings in block diagram form, including respectively the composite system view in some detail (FIG. 2 alone), with more detailed views of the upper stage module (FIG. 2A), the lower stage module (FIG. 2B) and a final module including the thermal transfer loop and process tool (FIG. 2C)

Systems and methods in accordance with the invention are founded on the apparatus shown in FIGS. 1 and 2, to which reference is now made. The primary units are, as seen in FIG. 1, an upper (temperature) stage module 10 using a first refrigerant, and a lower (temperature) stage module 12 employing a different refrigerant and interchanging thermal energy with the upper stage module 10 in various ways. The lower stage module 12 exchanges thermal energy, at a final temperature level that is at, above or below ambient, with a thermal transfer fluid that feeds through a process tool 14 in a loop, via a supply line 16 and a return line 18. Because of the number of individual units that are employed in the stages, details are depicted in added Figures by subdividing some principal elements of FIG. 1 into the composite system of FIG. 2, then providing diagrams which delineate details of the two modules (upper and lower stage, respectively), as separate FIGS. 2A and 2B and the final thermal transfer loop of FIG. 2C. FIG. 1 also depicts a control system 20 that receives inputs from an operator, and from sensors and transducers in the system, and that provides control signals to controllable elements in the temperature control system. A control system which may advantageously be employed is that described by Matthew Antoniou et al in a pending patent application dated. May 16, 2003 Ser. No. 10/439,299 and entitled "Systems and Methods of Controlling Temperatures of Process Tools".

Figure 2A:
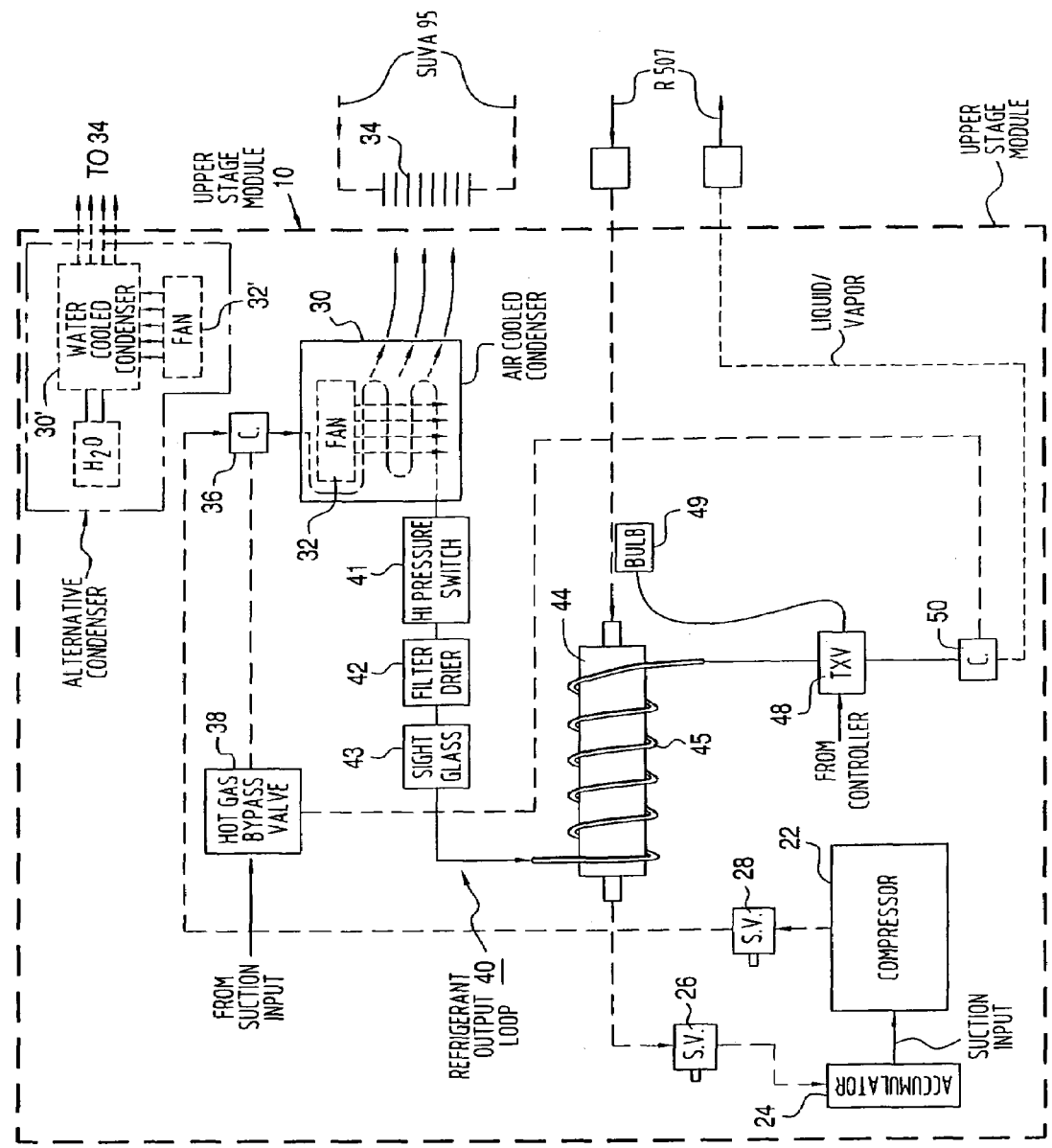
Figure 2B:
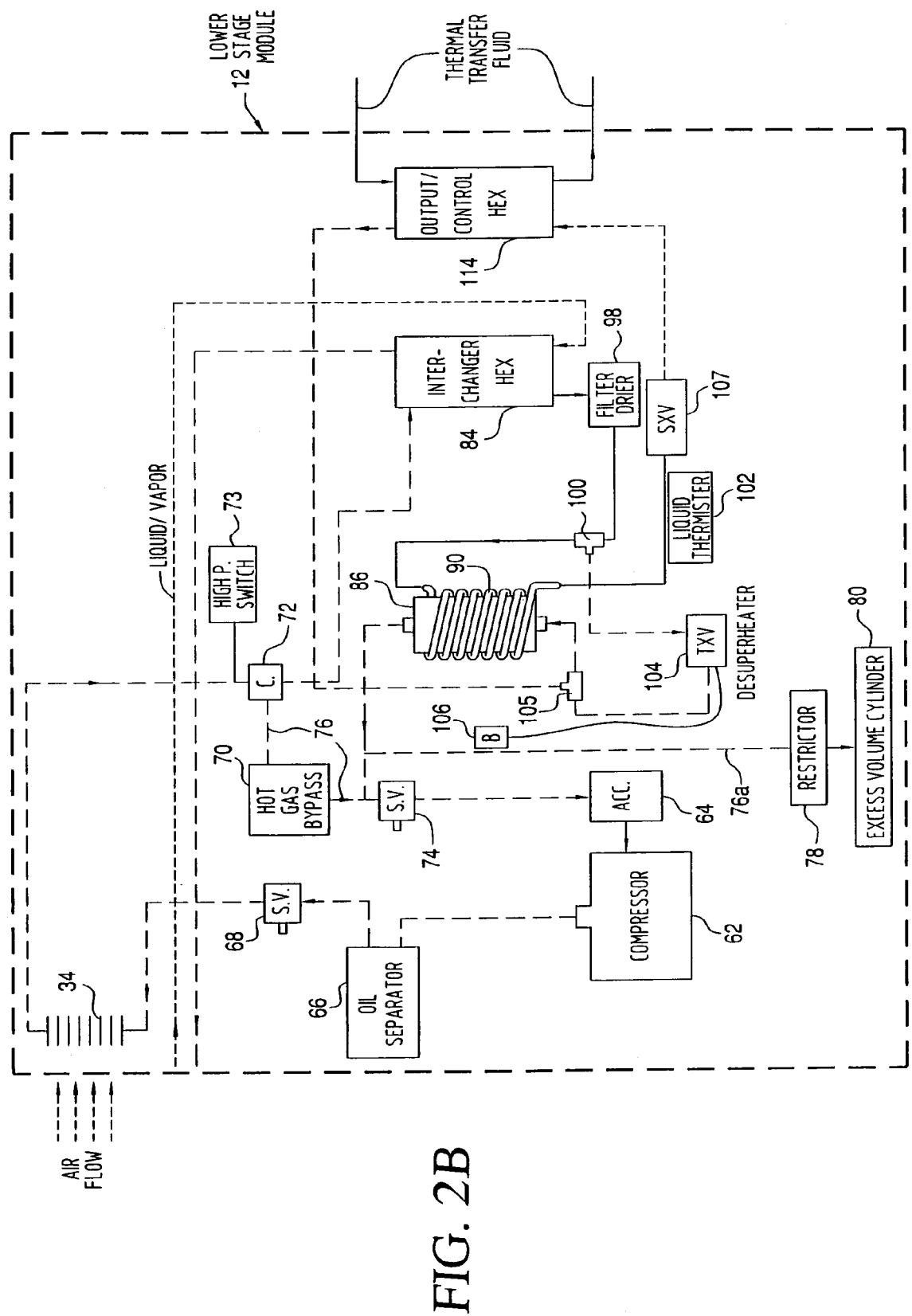
Figure 2C:
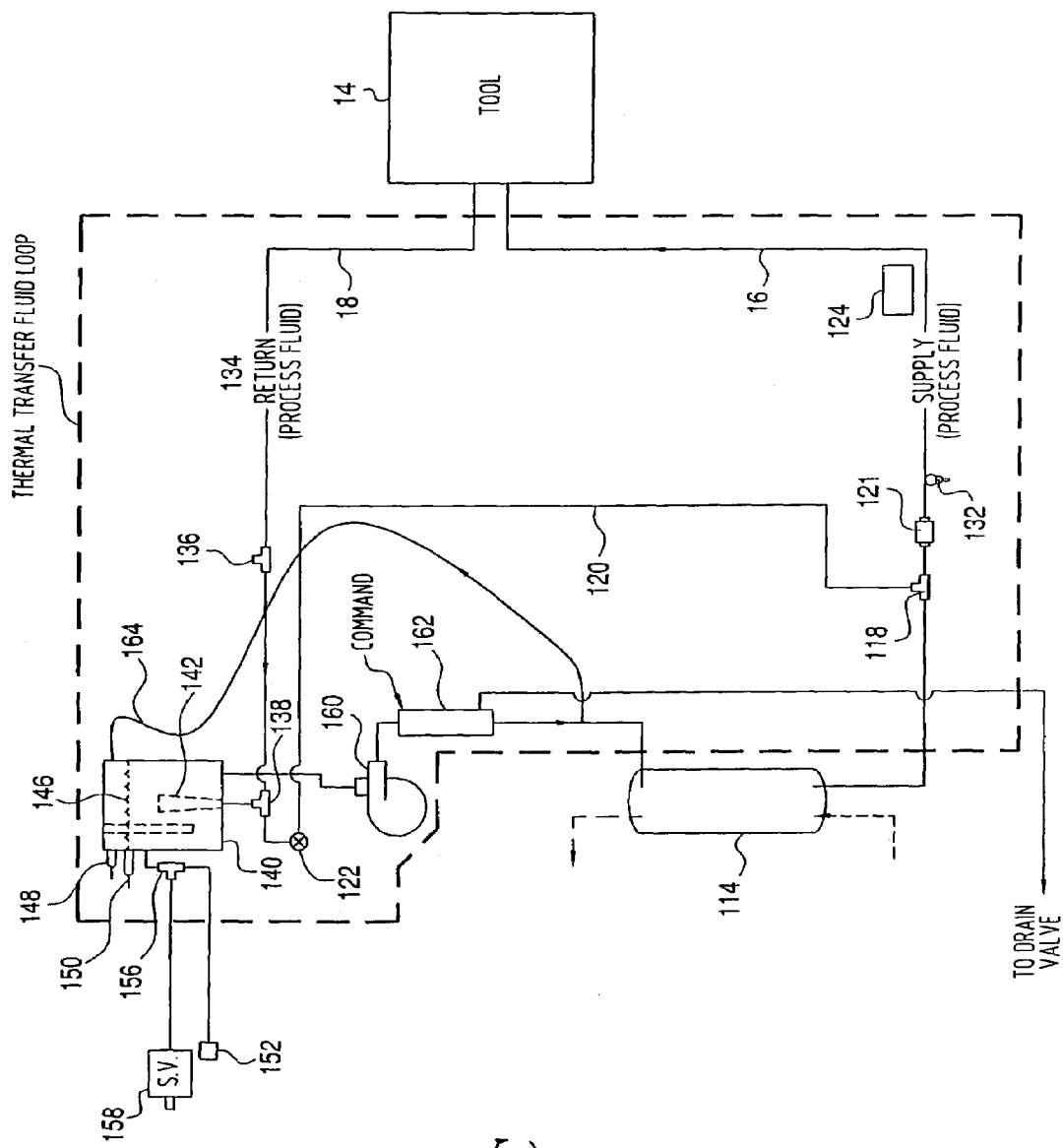

Referring now to FIGS. 1 and 2, together with the more detailed views of FIGS. 2A, 2B and 2C, the upper stage module 10 includes a compressor 22, here of nominally 7.5 kW capacity to meet the needs of a specific practical application. The compressor 22 pressurizes a refrigerant having a relatively high boiling point, such as R-507, raising its temperature. R-507 is a liquid at ambient pressure and temperature and after compression and condensation the refrigerant again becomes liquefied for use in a liquid/vapor state. After thermal energy exchange within the user system, expanded R-507 refrigerant in vapor state is returned to an input accumulator 24 at the suction input of the compressor 22. An input valve, such as a Schrader valve 26 ("S.V" in the drawings), couples into the suction input line so that refrigerant volume can be restored if needed. A different Schrader valve 28 is also included in the pressurized output line from the compressor 22.

In this example the compressed gaseous refrigerant in the upper stage 10 is liquefied in an air cooled condenser 30. The condenser 30 is compact, such as 5"×12"×24", and so configured relative to the compressor 20 and other elements as to fit within a standard form factor upper stage module 10 of 10"×24"×35". The modular installation concept is described in a co-pending application of Kenneth W. Cowans entitled "Systems and Methods for Temperature Control", Ser. No. 10/079,592 filed Feb. 22, 2002. As shown in that application, it is highly advantageous to be able to deploy modules of different capabilities with form factors that are either standard, or integral multiples of the standard. Such modules, mounted replaceably in a support frame, can then be used in different combinations to provide a variety of functions and meet a number of operative requirements that may change with time. In this example, both the upper stage module 10 and the lower stage module 12 are standard width units, fitting replaceably within receptacles in a standard frame or enclosure to form a double width assembly.

The air cooled condenser 30 includes a large fan 32 which blows cooling air across interior heat conductive conduits 33 transporting the compressed refrigerant gas from the compressor 22, thus extracting sufficient thermal energy to condense it to a pressurized liquid. The cooling air flow, exterior to the upper stage module 10, also flows into the adjacent lower stage module 12 (FIG. 2B) to pass over a finned conduit desuperheater heat exchanger 34 within that module 12. The conduit 34 within the heat exchanger transfers the compressed gas refrigerant into the lower stage module 12, so that substantial thermal energy is extracted by this means from the second refrigerant. Approximately 1250 watts of thermal energy is taken out in this example by cooling the gas exiting the low temperature stage compressor to a temperature not much warmer than the temperature of the ambient air.

At the input to the air cooled condenser 30 in the upper stage module 10, referring again to FIG. 2A, a coupler 36 provides an additional shunt path to a conventional (Danfoss) hot gas bypass valve 38 which is responsive to the suction input pressure at the compressor 22. When the input pressure is too low, the hot gas bypass valve 38 opens to add a flow of compressed gas into the chilled liquid/vapor refrigerant output that is fed from the upper stage module 10 to the lower stage module 12 (FIG. 2B). The output flow from the air cooled condenser 30 feeds into a refrigerant output loop 40 in the upper stage which includes, serially, conventional elements such as a high pressure switch 41, a filter drier 42 and a sightglass 43. The refrigerant then enters one input to a subcooler heat exchanger having a body 44 which internally receives expanded low temperature refrigerant that is being returned to the compressor 22 from the lower stage 12. A coil 45 wrapped about the body 44 transports the pressurized and liquefied refrigerant from the condenser 30, to further chill the refrigerant before it is controllably expanded by a thermal expansion valve (TXV) 48, such as is described in the W. W. Cowans U.S. Pat. No. 6,446,446 issued Sep. 10, 2002 and entitled "Efficient Cooling System and method". The TXV 48 is responsive to pressure variations influencing the position of an internal diaphragm as determined by the temperature of the returning refrigerant. The gas of the latter temperature, which is detected at a sensor bulb 49 disposed before the gas refrigerant input to the subcooler body 44 communicates a pressure that may modify the effective size of the orifice in the TXV 48. The output flow from the TXV 48 is a liquid/vapor mixture, in a ratio determined by the TXV 48 responsively to the input from the bulb 49. There may also be a supplemental gas input, when the hot gas bypass valve 38 is open, via a T-coupling 50. The injection of compressed gas via the hot gas bypass valve 38 and coupler 50 affects the temperature of the liquid/vapor output by raising the pressure of the liquid/vapor to a minimum value above that is predetermined by the setting of the hot gas bypass valve 38.

Where fabrication facilities utilize tools that are to be temperature controlled by systems in accordance with the invention and that permit the use of water as a cooling fluid, a different modular construction may be used for the upper stage module 10, as shown schematically in dotted line outline in FIG. 2A. In this example, the finned conduits 34 for SUVA 95 refrigerant are still employed in the lower stage module 10, along with a small fan 32' in the upper portion of the upper stage module 12, and air flow slots in the sidewall. This arrangement enables a common lower stage module 12 to be used with either type of condenser in a modular system.

In the lower stage module 12 as seen in FIG. 2B, a compressor 62, again of approximately 7.5 kW nominal capacity in this example, pressurizes a different refrigerant, such as SUVA 95. This refrigerant has a substantially lower boiling point than R-507 and is a gas at ambient temperature and pressure. To assure reliability, therefore, special expedients are used to maintain unrestricted flow and protect against overpressure. The lower stage compressor 62 receives suction input flows via an accumulator 64 and provides pressurized output flows via an oil separator 66. The oil that is filtered out by the separator 66 is returned by a shunt line through the accumulator 64 to the lower stage compressor 62 input. The oil separator 66 is useful because a refrigerant such as SUVA 95 used at temperatures as low as −55° C. or lower can be clogged with high viscosity lubricating oil if subsequent quantities of this oil are present at low temperature. The mass of SUVA 95 fluid may be supplemented via a Schrader valve 68 in the output line from the oil separator 66. The SUVA 95 output line from the finned desuperheater exchanger 34 feeds a separate hot gas bypass valve 70 via a T-coupling 72 which initiates a hot gas bypass loop that includes the valve 70. When the hot gas bypass valve 70 is opened in response to compressor input, the flow is directed through a shunt line 76 to the suction input to the lower stage compressor 62. The shunt line 76 output from the valve 70 also includes a Schrader valve 74. The same suction input line 76 containing SUVA 95 connects through a flow restricting orifice 78 to an excess volume cylinder 80 through a branch line 76a, the volumetric capacity of which helps to assure that the internal gas pressure of the refrigerant does not become excessive during periods of time when the system is inoperative. A high pressure switch 73 in the return line from the exchanger 34 is used to protect the compressor 62 in the case of an excessively high pressure occurring in the compressor output line during operation.

The principal flow path of the compressed gaseous SUVA 95 refrigerant after the compressor 62, oil separator 66 and finned heat exchanger 34 is to an interchange heat exchanger/evaporator 84. Heat energy is extracted from gaseous SUVA 95 after the compressor 62 by air flowing from the fan 32 (FIG. 2A) past finned heat exchanger 34 to cool the refrigerant. Further thermal energy is extracted by exchange in the interchange HEX unit 84 with the controllably expanded liquid-vapor output from the TXV 48 of the upper stage module 10. The evaporative cooling of the R-507 refrigerant in the HEX 84 assures efficient thermal energy extraction to at least partially liquefy the SUVA 95 refrigerant in the HEX 84. In the lower stage module 12, a subcooler body 86 receives the liquid SUVA 95 output from the interchange heat exchanger/evaporator 84. Expanded gaseous R-507 from the interchange heat exchanger 84 is returned through the subcooler body 44 in the upper stage module 10 (FIG. 2A) to the compressor 22 suction input in that module 10.

In FIG. 2B, the output of liquefied SUVA 95 is transported within a subcooler coil 90 disposed in thermal exchange relation about the subcooler body 86, in which interior counterflow of returning and expanded SUVA 95 aids in further chilling of the refrigerant.

There are two potential methods of control that are used in the lower stage module 12 subsystem. Both employ liquid/vapor expansion to current temperature settings. In one approach, as seen in FIG. 2B, an SXV 107 (solenoid expansion valve) regulates the flow of expanding pressurized liquid SUVA 95 at the command of the control (module 20 of FIG. 1). A liquid thermistor 102 in the SUVA 95 flow path after the subcooler coil 90 senses the temperature in the suction line exiting evaporator 84 and provides a corresponding signal to the control circuits 20, of FIG. 1 Whenever thermistor 102 senses that liquid SUVA 95 is in this line a signal is sent to control module 20 which causes SXV 107 to be shut.

The liquid output of SUVA 95 from the interchange heat exchanger 84 is passed through a filter drier 98 and a T-coupler 100 to the subcooler coil 90 for further cooling. The T-coupler 100 also has a side port communicating with a TXV functioning as a desuperheater valve 104 which is responsive to the temperature in the suction line input to the compressor 62, as detected by a sensor bulb 106. Opening of the desuperheater valve 104 injects liquid vapor refrigerant into the cold side input to the subcooler body 86 via a T-coupler 105. The output from the external subcooler coil 90 about the subcooler body 86 is pressurized liquid refrigerant (SUVA 95) at a temperature level determined by the operative parameters of both the upper and lower stages 10, 12, respectively. This liquefied refrigerant may flow by a burst disk (not shown) coupled to the line, and set at 500 psi for release of overpressure.

Figure 3:
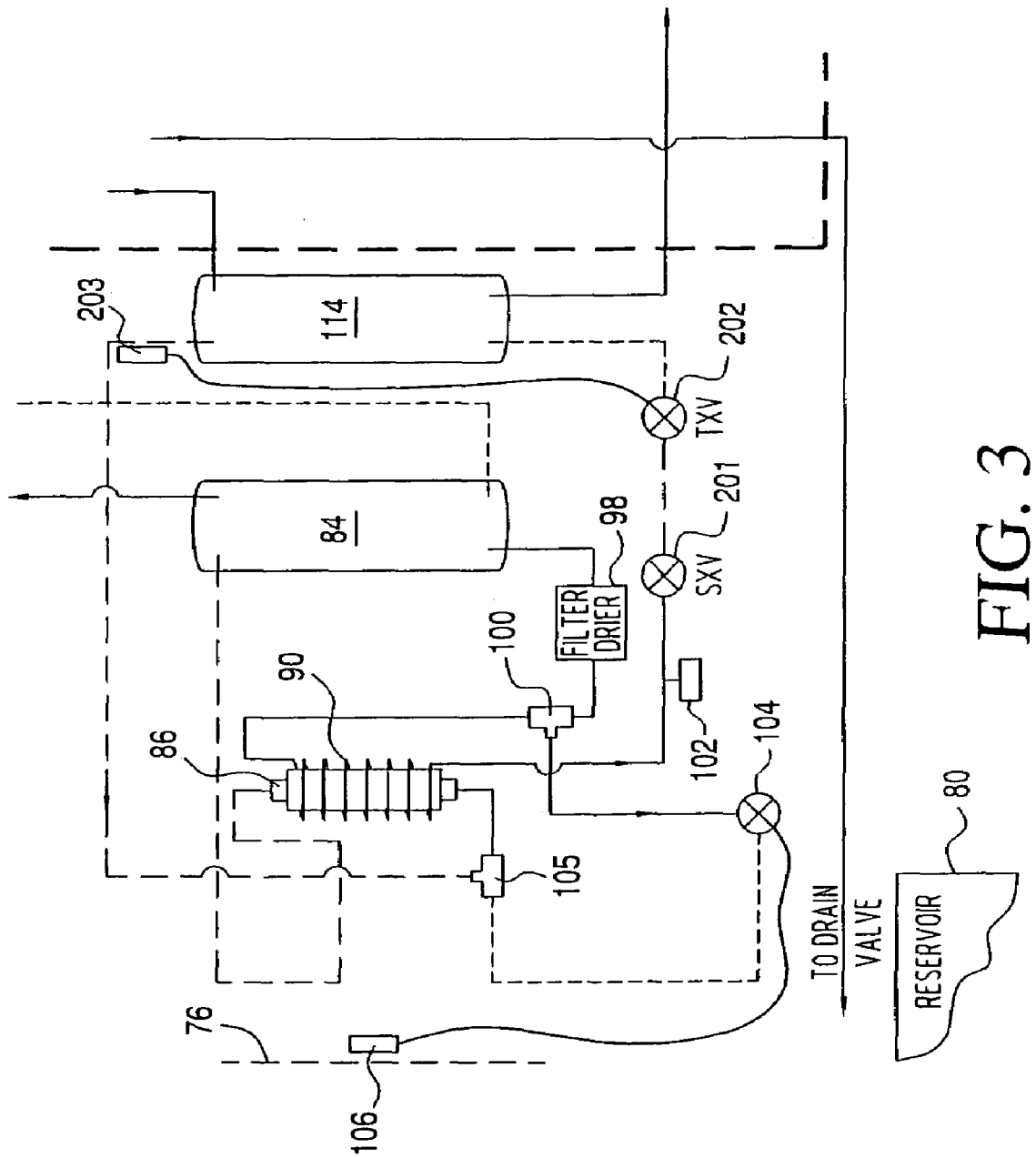
FIG. 3 is a detailed view of a portion of the lower stage module showing an alternate form of expansion valve system that may be used in the lower stage module.
Figure 6:
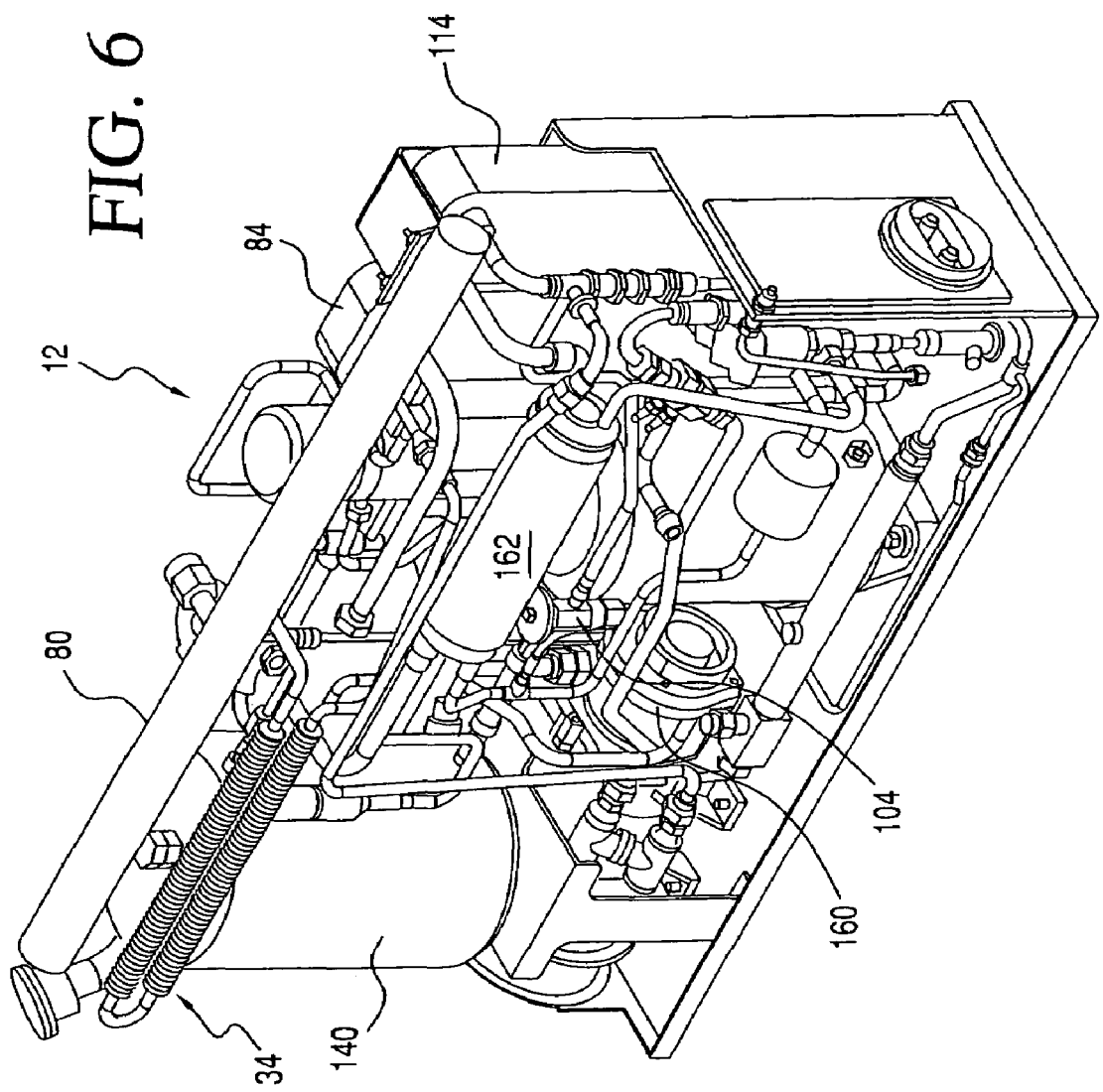
FIG. 6 is a perspective view of the practical implementation of the lower stage module presented at a different angle than in FIGS. 3 and 4 to show a different part of the interior.

In the second control method, shown in FIG. 3, a SXV 201 controlled by control box 20 is used in series with a TXV 202 as shown in FIG. 6. The use of a TXV, with its inherent feedback via the bulb 203 replaces the function of liquid thermistor 102 as described above.

In the example of FIG. 3, the liquefied SUVA 95 is fed successively for controlled expansion through a solenoid expansion valve (SXV) 201, which has a fixed orifice size and operates with a varying duty cycle under control signals from the control system 20, and then a second, serially coupled thermal expansion valve (TXV) 202. The second valve or TXV 202 has a variable orifice size to introduce an analog flow variation, determined by electrical signals from the control system 20, which sets the temperature level of output provided to a second heat exchanger/evaporator 114 which controls system output temperature. The temperature of that output is sensed by a closed bulb element 203 (FIG. 3) that converts the temperature to a variable pressure via a conduit 110 to the second valve or TXV 202. The serially combined expansion valve functions have important operative advantages for evaporative thermal control units, as noted before.

When the SXV is used in conjunction with a TXV for control, the liquid thermistor 88 of FIG. 2B is not used. When only the SXV is used to regulate flow and thereby control the liquid thermistor is needed to prevent liquid exiting from the evaporator 114.

The serial SXV 201 and TXV 202 combination of expansion valves shown in FIG. 3 is advantageous not only in achieving control of liquid/vapor flow but also in more general system terms. It is desirable in general to employ an expansion valve having a large orifice capability in order to meet maximum flow demands. A large orifice size, however, carries with it the danger of transferring some liquid refrigerant into the post-expansion line, because such a flooding condition introduces control instabilities, and the likelihood of compressor mechanism damage. To prevent or limit flooding, systems have been designed which sense the presence of liquid refrigerant in the compressor input, or regulate the capacity of the refrigeration loop. In the present system, however, a large orifice can be employed in the SXV 201, making available increased cooling power at temperature levels above minimum. This feature enables the system to cool down rapidly. Flooding does not occur, and control is maintained, however, because the TXV 202 functions in an analog fashion limiting the amount of flow as necessary with a variable orifice. Feedback of a corrective pressure from the temperature responsive sensor bulb 203 to the TXV 202 assures maintenance of an opening optimized for the control setting. Consequently, the liquid-vapor mix fed into the second or output heat exchanger/evaporator 114 is boiled off in efficient heat exchange relation with the process fluid, while maintaining the temperature desired, and with no flooding under transient conditions.

The liquid-vapor SUVA 95 input from the SXV 107 of FIG. 2B (or, in the case of the control system shown in FIG. 3, from SXV 201 and TXV 202), is supplied to the second heat exchanger/evaporator 114. This is a selectively controlled flow for chilling the counter-flowing thermal transfer fluid, such as Galden HT-70.

The system also includes a thermal transfer fluid loop physically contained principally within the housing of the lower stage module 12 of FIG. 2B, but extending externally to the tool 14, as shown schematically in FIG. 2C. The temperature controlled thermal transfer fluid output from the evaporative heat exchanger 114 is coupled via the supply line 16 to the tool 14 by way of a T-coupling 118, a sideport of which leads to a pressure relief line 120 that terminates at an adjustable pressure relief valve 122. Signals indicating the pressure of the thermal transfer fluid are provided to the control system 20 via a pressure transducer 132 open to the supply line 16.

The return line 18 for process (i.e., thermal transfer) fluid from the tool 14 includes a check valve 134 which blocks flow in the reverse direction toward the tool 14 but allows flow of process fluid through a flow meter 136 that provides flow rate signals to the control system 20. The return line 18 feeds through a T-coupling 138 into a reservoir 140 for the process fluid. Return flow is via a diverging internal cone or nozzle 142 that, in a reversible manner, reduces the flow velocity present in input flow within the enclosed reservoir 140. The cone transfers almost all the velocity energy in the input flow to pressure energy, thus minimizing overflow effects. A level sensor 146 within the reservoir 140 and a pressure transducer 148 open to the reservoir signal the values of these parameters to the control system 20. The reservoir 140 also is coupled to a pressure relief valve 150 which provides security against over-pressurization. Independently, as seen in FIG. 2B, a Schrader valve 152 to pressurize the reservoir 140 is coupled in common to a T-coupler 156 open to the reservoir 140 interior.

In the thermal transfer loop shown primarily in FIG. 2C, the outlet from the reservoir 140 feeds a pump 160, typically of the regenerative turbine type, which inputs the process thermal transfer fluid to the second heat exchanger/evaporator 114 through a heater 162, typically of the electrical resistive type. A cap tube bleed line 164 is coupled from the upper-most region of the reservoir 140 to a downstream location relative to the pump 160 and before the input to the evaporative heat exchanger 114. A drain valve 166 (FIG. 2B only), which may be of the Schrader type, is at the remote end of a separate bypass from the heater 162 outlet and at a lower elevation, to permit the entire system to be drained as desired.

The system of FIGS. 1 and 2, in operation, provides continuous temperature control of the process tool 14 in the range from −80° C. to +60° C., and to higher levels above ambient if desired. Both upper and lower stage modules 10, 12 operate continuously, as is needed for reliable, very long term precision performance, even though the cooling loads may be very low, as when the heating capability is being used. In most operative situations that require heat, short term heating is employed to restore temperature so that the process tool 14 can shift to another mode, as is done with semiconductor cluster tools. At times, steady state operation at above ambient is maintained for some duration to effect particular process sequences.

The upper stage 10, operating with R-507 refrigerant, absorbs all of the heat of the lower stage load, insulation losses and all the power supplied to the lower stage refrigerator subsystem. The upper stage then pumps this heat to a higher temperature in order to reject it to the surrounding ambient cooling, shown as air cooling in the current example. As shown in dotted lines in FIG. 2A, the fan 32 and air cooled condenser 33 can alternatively be replaced by a supply of facility cooling water using a cascade chiller and a liquid-to-refrigerant heat exchanger/condenser of conventional design. When this mode of absorbing the condensing heat of the R-507 refrigerant is used, a small fan is employed to provide a flow of cooling air to pass by fined tube exchanger 34.

In effecting this function of absorbing the heat output of lower stage 12, expanded liquid-vapor R-507 mixture flows to one counterflow input of the interchange HEX/evaporator 84 in the lower stage 12. The opposite counterflow input receives minimally chilled gaseous SUVA 95 refrigerant from the compressor 62 in the lower stage 12 after being partially desuperheated in finned tube exchanger 34. After thermal energy exchange, the SUVA 95 is liquefied and passed to the entrance of subcooler coil 90 at the same temperature as the expanded R-507 that is returned to the upper stage module 10. The SXV 107 (or in the alternate control system shown in FIG. 3 the SXV 201 and TXV 202) under command input from the control system 20, then adjusts the liquid/vapor flow in the SUVA 95 through the evaporator heat exchanger 114, to provide enough cooling to set the temperature level to which the process fluid is to be brought in the second heat exchanger/evaporator 114.

The system can be considered both a chiller and heater with a controlled output that can cool or heat a flow of pumped liquid so as to control the temperature of that liquid. Heat is supplied by an electrical heater 162 as needed to raise the temperature of the pumped liquid.

Energy efficiency is enhanced by using air flow from the fan 32 in the upper module 10 to convectively cool the finned conduits 34 in the adjacent lower stage module 12.

This type of interchange eliminates two fluid/gas connections between the modules that would be needed if gaseous SUVA 95 from the output of compressor 62 were to be cooled of its superheat in the upper stage module 10.

When operating in the temperature range above 20° C., the refrigeration capacity of the lower stage compressor 62 is called upon only to a limited extent. In the event that the return suction pressure as the lower stage compressor 62 is too low for proper compressor operation, the hot gas bypass valve 70 opens to supply more gaseous refrigerant into the suction line, preventing damage to the associated compressor 62. As the output of valve 70 is warmer than the input of compressor 62 can effectively accept, the desuperheater valve 104 provides enough expanded SUVA 95 to maintain the input to compressor 62 at acceptable levels. In the variation of FIG. 3, sensor bulb 204 is used to sense temperature input to the compressor and supply adequate liquid refrigerant to maintain correct temperature.

The reservoir 140 and the principal functioning elements of the process fluid supply and return system are contained within the lower stage module 12, which also is designed to be sufficiently compact to fit within a standard width module is 10"×24"×35". The thermal transfer fluid, here Galden HT-70, is fed from the reservoir 140 by the pump 160 and through the second heat exchange/evaporator 114 to be lowered to the temperature needed for maintaining the tool 14 at its then-desired temperature. The supply line 16 and return line 18 outside the lower stage module 12 can be, within limits imposed by flow impedance, an arbitrary length. External connections of these lines 16, 18 can be made at input and output manifolds (not shown in FIG. 1 or 2) in the lower stage module 12. After being circulated through the tool 14, the thermal transfer fluid is transported on the return line 18 to be injected via the feeder cone 142 into the reservoir 140.

In the lower level cooling range, for refrigeration to −80° C., the refrigeration capacity of the lower stage compressor 62 is utilized, up to a maximum. The upper stage module 10 continues to function as previously described to provide the regulated liquid-vapor mix of R507 to the lower stage module 12. Compressed SUVA 95 refrigerant is first desuperheated by air cooling in the finned conduit 34 segment in the line adjacent the first module 10 and then fully condensed in the interchange heat exchanger/evaporator 84. The SUVA 95 liquid/vapor input mixture, as modulated by the expansion valves 107, or 201, 202, is applied to the second heat exchanger/evaporator 114 along with the oppositely flowing "Galden HT-70". Cascading in this fashion employs the individual properties of the two different refrigerants to best advantage, and without anomalies or dead zones anywhere in the range of controllable temperatures. When heating the thermal transfer fluid to or above ambient temperature both the upper stage module 10 and the lower stage module 12 continuously operate but with minimal chilling. Heating of a process tool is most often utilized, as in semiconductor cluster tools, to restore temperature after a period of operation in a refrigeration cycle. It can, however, also be utilized to maintain the thermal transfer fluid and the process tool 14 at an elevated temperature for a period of time for a specific tool function. The level of heating achievable, and the rage of heating, are dependent upon the wattage rating of the heater 162 which can be arbitrarily selected. Typically, the heater 162 is an electrical resistance device of approximately 1000-1500 watts capacity.

The system includes a substantial number of sensing and command elements which operate in conjunction with the control system 20 of FIG. 1 to provide the desired control of tool 14 temperature. The pump 160 provides a given flow rate of thermal transfer fluid, although the rate can be varied if desired by using a variable speed driver. The tool 14 itself conventionally has its own control system which specifies the fluid temperature that is needed to maintain the tool 14 at a chosen level given a known flow rate for the thermal transfer fluid. Thus it is only required to assure that the supply line 16 or the tool 14 be at a given temperature, which may be sensed by a conventional transducer or transducers and supplied to the control system.

In response to the operative setting that is chosen, the control system 20 determines the refrigerant temperature levels that are to be established within the lower stage, and/or the heat to be added. The load on the lower stage will influence the temperature of the upper stage by means of the action of TXV 48 under the influence of sensor bulb 49. Consequently, the input from the controller 20 is to the SXV 107 FIG. 2B (or 201 and TXV 202 of FIG. 3) in the lower stage 12, or to the heater 162 to introduce a desired thermal transfer fluid increase in temperature. The heater 162 may also be used for the only control at above ambient temperature if no cooling is required of the system or even for vernier adjustments of temperature when the cooling system has slightly over-cooled the thermal transfer fluid.

Other sensed parameters are input to the controller 20 from the pressure transducer 124 in the supply line to the tool 14, and the flow meter 136 in the return line 18. These signals are used to indicate that the thermal transfer fluid is flowing without obstruction or leakage. For reliability, also, the level sensor 146 and the pressure transducer 148 at the reservoir 140 for thermal transfer fluid generate signals that warn of present or incipient problems.

Other operative features that are employed in the system are of practical importance to system life and reliability. Because SUVA 95 has characteristics that are optimized for lowest temperature operation it has a low boiling point and is above its critical temperature at ambient temperature. Its pressure can therefore build to a relatively high level when average system temperatures rise. In order to prevent catastrophic failure in the event of overpressure, gas in the suction line to the lower stage compressor 62 (FIG. 2B) is shunted through a small orifice 78 into the excess volume cylinder 80 which is of adequate strength to withstand high pressure and this path can also counterflow SUVA 95 gas to the compressor 62 if the input pressure drops. The burst disk 102 set to be actuated at 500 psi provides further assurance that internal damage will not occur.

The fluid characteristics of SUVA 95 are such that compressor 62 operation requires oil in the refrigerant, although the presence of substantial amounts of oil in the heat exchangers at very low temperatures is not desirable. Accordingly, the oil separator 66 extracts oil almost immediately from the pressurized compressor 62 output and returns the oil to the suction input manifold 64 to the compressor 62.

As seen in FIGS. 2B and 2C, the lower stage module 12 includes a shunt line between the supply line 16 and the return line 18, this shunt line 120 incorporating an adjustable pressure relief valve 122 which may correspond to the configuration described in the K. W. Cowans application entitled "Systems and Methods for Temperature Control", Ser. No. 10/079,542 filed Feb. 22, 2002. In the event of a pressure imbalance, the pumped fluid is lowered in pressure in accordance with the adjustable setting of the relief valve 122, which couples into the input cone 142 in the reservoir 140.

Figure 4:
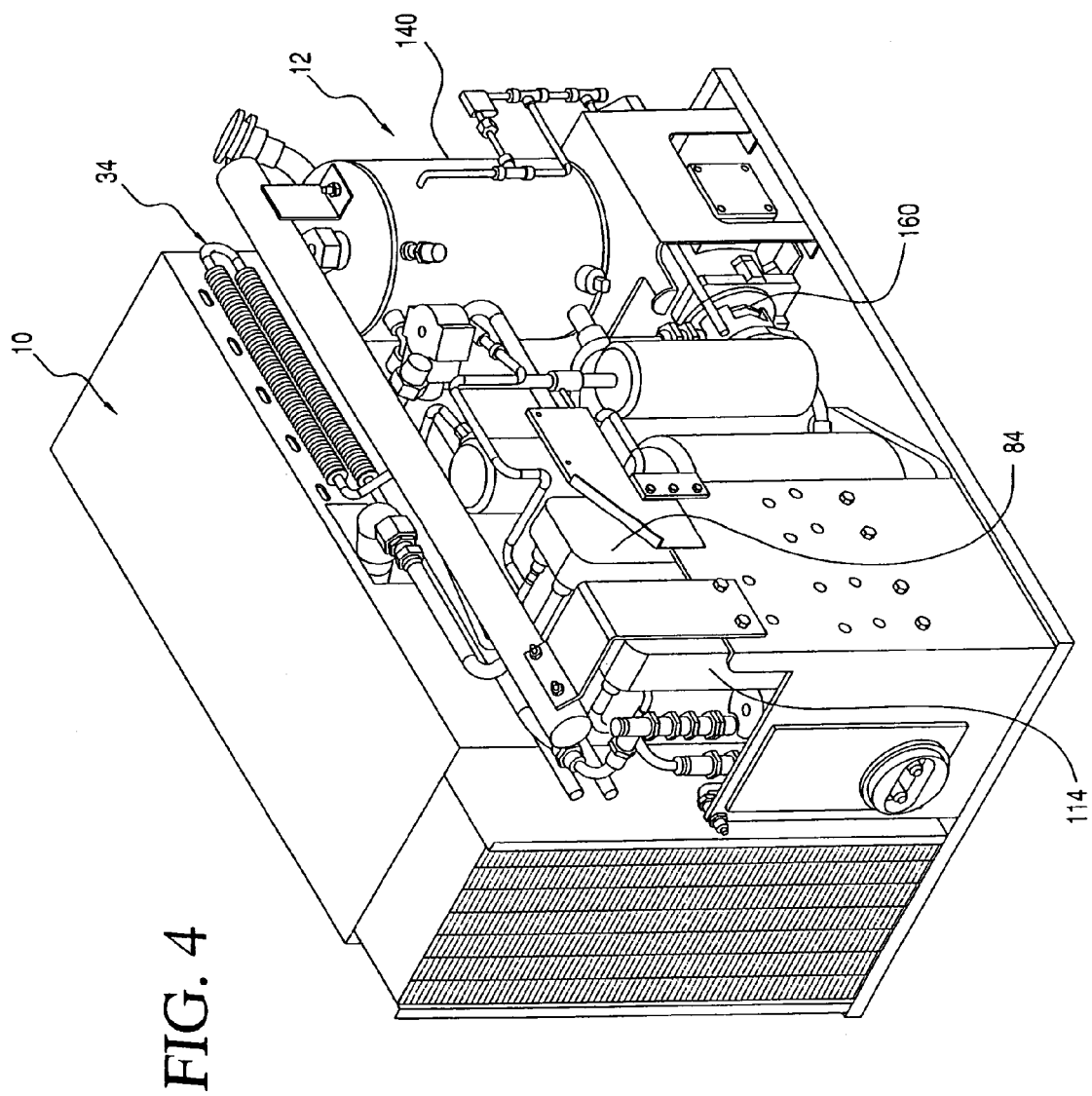
FIG. 4 is a perspective view of the exterior of a practical example of one combination of an upper stage module including an air cooled condenser, and a lower stage module with the exterior walls removed to show a part of the interior.
Figure 5:
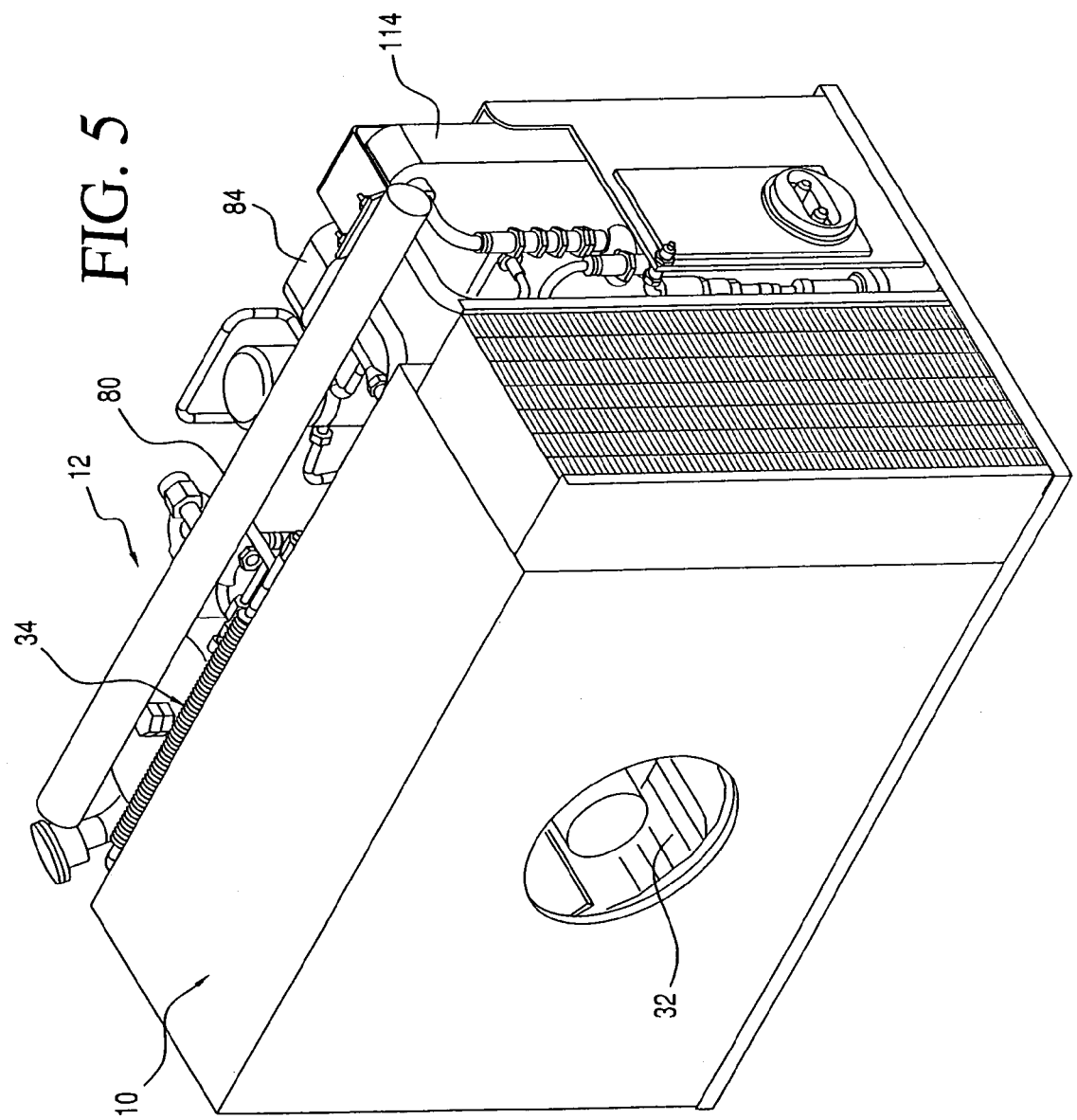
FIG. 5 is a perspective view of an implementation of the two modules of FIG. 3, as seen from a different angle.

Different views of parts of a practical exemplification of the system of FIGS. 1 and 2 are shown in FIGS. 4, 5 and 6 which depict, in different perspectives two side-by-side modules with housings containing the upper stage 10 and lower stage 12, and illustrating the air-cooled condenser version. In some process tool installations, water as a cooling medium must be avoided. Thus the air-cooled condenser with a fan 32 mounted on a transverse rotational axis, as seen in FIGS. 3 and 5, provides air flow across conventional internal refrigerant flow conduits (not seen in FIGS. 4, 5 and 6) toward an outlet screen extending across the module width. This fan 32 is also deployed to direct air centrifugally outward and laterally toward the lower stage module 12 through air slots in the housing well. Inasmuch as the internal configuration of the upper stage module 10 can be in accordance with the teaching of K. W. Cowans patent application Ser. No. 10/079,542, referred to above, these details are not described herein. However, the slots in the sidewall of the upper module 10 that faces the lower stage module 12 provide a flow cooling air transversely between the two modules 10, 12 and over the finned conduits 34 for the SUVA 95 lines from the lower stage compressor 62 that can be seen adjacent these orifices.

FIGS. 4, 5 and 6 also demonstrate that there are only two direct refrigerant couplings between the sidewall of the upper stage module 10 and the facing side of the lower stage module 12. Furthermore, the modules 10, 12 are also sufficiently compact, with this design, to meet the standard form factor. The compressor 62, reservoir 140, excess volume reservoir 80 and pump 60 are the largest volumetric elements within the lower stage module 12. Manifolds or accumulators for coupling thermal transfer fluid to and from the supply and return lines 14, 16 are disposed adjacent one end of the structure, and the electrical heater 162 is disposed adjacent the base of the unit and in communication with the output manifold.

Another advantage of this approach is that the modules can also function separately, if desired, although modifications would be employed for thermal energy interchange with the thermal transfer fluid and tool in each case.

Another advantage of the modular configuration described is that the two modules can be mounted in a vertical assembly with the high temperature module 10 mounted above the lower stage module 12. This is desirable in some installations wherein a smaller footprint may be needed and height is acceptable.

Although a number of forms and variations have been described it will be appreciated by those skilled in the art that the invention is not limited thereto but encompasses all alternatives and expedites within the scope of the appended claims.

The invention claimed is:

1. A control system for providing controlled expansion of a liquid refrigerant from a source, under command of a controller to maintain a heat exchanger/evaporator at a selected temperature level, and comprising:
    a first expansion valve comprising a solenoid actuated valve having a fixed orifice size and operated by the controller at a selected duty cycle rate;
    a second expansion valve coupled in series with the first expansion valve and having a variable orifice size responsive to control signals from the controller, and
    a temperature responsive sensor coupled to the second expansion valve, the sensor including a closed bulb positioned to be responsive to the temperature of the heat exchanger/evaporator and including a coupling feeding back a corrective pressure to the second expansion valve,
    whereby the first expansion valve enables meeting maximum flow demands and the second expansion valve militates against the flow of liquid into the heat exchanger/evaporator portion of the refrigeration loop.

2. A control system as set forth in claim 1 above wherein the refrigerant is SUVA 95, and wherein the temperature responsive sensor positioned in thermal contact relation to the heat exchanger/evaporator and including a conduit coupling therefrom to the interior of the second expansion valve to adjust the flow from the second valve to establish the desired temperature at the heat exchanger/evaporator.

3. A system for providing, in response to command signals, a controllable flow of refrigerant in a liquid/vapor state to an evaporative heat exchanger from an input flow of pressurized liquid refrigerant, comprising:
    a solenoid operated expansion valve having a given orifice size for full flow output operation; the solenoid operated valve being operable at a controllable duty cycle in response to command signals;
    a thermal expansion valve coupled to receive the output from the solenoid operated expansion valve, the thermal expansion valve having a variable orifice that is electrically controllable by command signals to modulate the liquid/vapor mixture to be provided to the evaporative heat exchanger; and
    a temperature sensing device in thermal communication with and responsive to temperature levels in the refrigerant after passing through the evaporative heat exchanger for adjusting the variable orifice setting to obtain the desired output temperature from the evaporative heat exchanger.

* * * * *